United States Patent Office 3,129,222
Patented Apr. 14, 1964

3,129,222
2,2,5-TRISUBSTITUTED-4-OXAZOLIDINONE
COMPOUNDS
John B. Bicking, Lansdale, Pa., assignor to Merck & Co.,
Inc., Rahway, N.J., a corporation of New Jersey
No Drawing. Filed Dec. 1, 1960, Ser. No. 72,859
13 Claims. (Cl. 260—240)

This invention relates to novel 2,2,5-trisubstituted-4-oxazolidinone compounds which may or may not contain additional substituents, and which possess central nervous system stimulating properties, and to a novel method for the preparation of these compounds.

The 2,2,5-trisubstituted-4-oxazolidinone compounds of this invention have the general structural formula

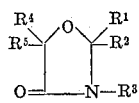

wherein $R^1$ is a lower-alkyl radical, preferably the methyl radical; $R^2$ is a lower-alkyl radical, preferably containing 1 or 2 carbon atoms and either unsubstituted or halogen substituted, advantageously a chloroalkyl; $R^3$ represents hydrogen or a lower alkyl radical, preferably the methyl radical; $R^4$ represents a phenylaliphatic radical wherein the aliphatic portion contains preferably from 2 to 3 carbon atoms and can contain sulfur or oxygen as part of the aliphatic moiety, the aliphatic group being either a saturated or unsaturated aliphatic and either a straight or branched chain and when branched the branching preferably occurs in alpha-position to the phenyl radical, and wherein one or more hydrogens of the aliphatic group can be replaced by halogen, as chlorine, bromine and the like. The phenyl moiety of the phenylaliphatic radical represented by $R^4$ can be either unsubstituted or monosubstituted with a hologen, preferably chlorine or a halogen-like radical such as the trifluoromethyl radical, a lower alkyl, preferably methyl, or with a lower alkoxy group, preferably the methoxy. Thus, the phenylaliphatic radical advantageously can be phenylalkyl, phenylalkenyl, phenylhaloalkyl, phenylalkoxyalkyl, phenoxyalkyl, phenylmercaptoalkyl, or phenylalkylmercaptoalkyl wherein the phenyl and aliphatic portions can be unsubstituted or substituted in the manner described above. $R^5$ represents hydrogen or a lower alkyl radical, preferably the methyl radical.

Of the above compounds, those wherein $R^4$ represents a phenylalkenyl or phenylalkyl radical have been found to possess a particularly high order of activity as central nervous system stimulating agents, and within this group the 2,2-dimethyl-5-styryl-4-oxazolidinone the 2,2-dimethyl-5-phenethyl-4-oxazolidinone, and the 2,2-dimethyl-5-(3-phenylpropyl)-4-oxazolidinone have been found to possess an especially high order of activity.

The novel compounds of this invention are advantageously prepared by reacting an alpha-hydroxy amide with a ketone. The reaction advantageously is carried out in the presence of a strong mineral acid and preferably at room temperature or with cooling. The reaction can be illustrated by the following scheme:

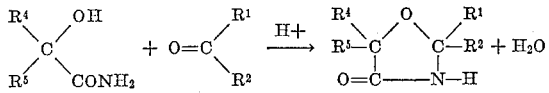

When the radical $R^3$ shown attached to the 3-position nitrogen in the generic structural formula is a lower alkyl, such as the methyl radical, the compounds can be prepared by first making the compound wherein $R^3$ is hydrogen by the above illustrated procedure and then alkylating the oxazolidinone compound thus obtained. The reaction advantageously is carried out by treating the oxazolidinone with sodium hydride or other strong base as sodium amide, potassium tertiary butoxide and the like, and then adding methyl iodide, dimethyl sulfate, or other known alkylating agents to the reaction mixture. The reaction generally is carried out with heating, preferably at reflux, in the presence of a solvent such as benzene.

When the alpha-hydroxy amide is not readily available, it can be prepared either by hydrolysis of the intermediate cyanohydrin or by the ammonolysis of esters of the intermediate alpha-hydroxy acid.

The following examples describe the preparation of certain compounds falling within the scope of this invention by the novel methods found suitable for preparing them, as well as a dosage form by which these compounds can be administered. It is to be understood, however, that the examples are illustrative and in no wise limit the invention to the particulars included therein.

EXAMPLE 1

*2,2-Dimethyl-5-Styryl-4-Oxazolidinone*

Step A.—Concentrated hydrochloric acid (80 ml.) is added dropwise during 50 minutes with stirring and ice-bath cooling to a mixture of 132 g. (1.0 mole) of cinnamaldehyde, 300 ml. of ether and 70.5 g. (1.08 moles) of powdered potassium cyanide. The mixture is stirred with ice-bath cooling for an additional hour. The ether layer then is decanted, washed with saturated sodium bisulfite solution and dried over sodium sulfate. The ether is evaporated and the residue triturated with petroleum ether to cause crystallization. The crude product is crystallized from a mixture of benzene and cyclohexane to give 113 g. of 2-hydroxy-4-phenyl-3-butenonitrile, M.P. 72–75° C. The cyanohydrin (83.5 g., 0.525 mole) is dissolved in 400 ml. of ether, the solution chilled, and an ice-cold mixture of 175 ml. of concentrated hydrochloric acid and 175 ml. of concentrated sulfuric acid added. The red solution is allowed to stand 4 hours at 5° C. To the solution is added 1,200 ml. of ice-water and the crystalline product that separates is recrystallized from ethanol to give 52.0 g. of 2-hydroxy-4-phenyl-3-butenoamide.

Step B.—Dry hydrogen chloride is bubbled into 450 ml. of acetone until 4.5 g. is absorbed. 2-hydroxy-4-phenyl-3-butenoamide (45.0 g., 0.254 mole) is added, and the resulting solution is allowed to stand at room temperature for 16 hours. The solution is neutralized by the addition of saturated sodium bicarbonate solution; then approximately 300 ml. of acetone is removed by distillation in vacuo and the residual solution diluted with 400 ml. of water. The crude product that separates is recrystallized twice from isopropyl alcohol to yield 44.0 g. of 2,2-dimethyl-5-styryl-4-oxazolidinone, M.P. 147.5–149° C.

Analysis.—Calculated for $C_{13}H_{15}NO_2$: C, 71.86; H, 6.96; N, 6.45. Found: C, 71.95; H, 7.10; N, 6.39.

EXAMPLE 2

*2-Ethyl-2-Methyl-5-Styryl-4-Oxazolidinone*

Dry hydrogen chloride is bubbled into 200 ml. of ethyl methyl ketone until 2.0 g. is absorbed. 2-hydroxy-4-phenyl-3-butenoamide (17.7 g., 0.1 mole, prepared as described in Example 1, step A) is added and the solution allowed to stand 22 hours at room temperature. The solution then is neutralized by the addition of sodium bicarbonate solution, excess ketone is distilled in vacuo, and the oily product that separates is taken up in ether and dried over sodium sulfate. The ether is evaporated and the residual oil is vacuum distilled to obtain 15.0 g. of viscous oil, B.P. 193–195° C. at 1.3 mm. pressure. The oil is dissolved in benzene and the solution diluted with petroleum ether yielding 2-ethyl-2-methyl-5-styryl-4-oxazolidinone in crystalline form. Repeated recrystal-

EXAMPLE 3

2,2-Dimethyl-5-Phenethyl-4-Oxazolidinone

Hydrogenation at room temperature and atmospheric pressure of 4.4 g. (0.02 mole) of 2,2-dimethyl-5-styryl-4-oxazolidinone (prepared as described in Example 1) in 80 ml. of ethanol using 1.0 g. of a 5% platinum on charcoal catalyst, proceeded with the uptake of approximately 0.02 mole of hydrogen. The catalyst then is removed by filtration, the solution evaporated and the residue triturated with water to give 3.0 g. of 2,2-dimethyl-5-phenethyl-4-oxazolidinone, M.P. 90–92° C. Recrystallization from an isopropyl alcohol-water mixture gives 2.3 g. of pure product, M.P. 91–93° C.

*Analysis.*—Calculated for $C_{13}H_{17}NO_2$: C, 71.20; H, 7.82; N, 6.39. Found: C, 71.16; H, 7.93; N, 6.38.

EXAMPLE 3-a

2,2-Dimethyl-5-Phenethyl-4-Oxazolidinone

*Step A.*—By replacing the 2,2-dimethyl-5-styryl-4-oxazolidinone employed in Example 3 by an equivalent quantity of 2-hydroxy-4-phenyl-3-butenoamide (prepared as described in Example 1, step A) and following substantially the same hydrogenation procedure described in Example 3, there is obtained 2-hydroxy-4-phenylbutyramide, M.P. 128–130° C.

*Step B.*—By replacing the 2-hydroxy-4-phenyl-3-butenoamide employed in Example 1, step B, by an equivalent quantity of the 2-hydroxy-4-phenylbutyramide obtained as described above, and condensing the latter compound with acetone in the presence of hydrogen chloride by substantially the same procedure described in Example 1, step B, there is obtained 2,2-dimethyl-5-phenethyl-4-oxazolidinone having the same melting point and analysis as the product obtained in Example 3.

EXAMPLE 4

2,2-Dimethyl-5-Benzylmercaptomethyl-4-Oxazolidinone

*Step A.*—2 - hydroxy - 3 - benzylmercaptopropionitrile [68.0 g., 0.353 mole, prepared by the method of Gawron and Glaid, J.A.C.S. 71, 3232 (1949)], is dissolved in 350 ml. of ether, the solution chilled, and an ice-cold mixture of 135 ml. of concentrated hydrochloric acid and 135 ml. of concentrated sulfuric acid added. After standing 7 hours at 5° C., the solution is diluted with 500 ml. of ice-water. The amide precipitates and is purified by recrystallization from isopropyl alcohol, yielding 45.7 g. of 2-hydroxy-3-benzylmercaptopropionamide, M.P. 98.5–99.5° C.

*Analysis.*—Calculated for $C_{10}H_{13}NO_2S$: N, 6.63. Found: N, 6.63.

*Step B.*—Dry hydrogen chloride is passed into 200 ml. of acetone until 2.0 g. is absorbed. 2-hydroxy-3-benzylmercaptopropionamide (21.1 g., 0.1 mole) is added, and the solution is allowed to stand 20 hours at room temperature. The solution is neutralized with sodium bicarbonate solution, and then most of the acetone is removed by distillation in vacuo. 2,2-dimethyl-5-benzylmercaptomethyl-4-oxazolidinone separates in crystalline form and is purified by recrystallization from ethyl acetate yielding 12.0 g. of purified oxazolidinone, M.P. 106.0–107.5° C.

*Analysis.*—Calculated for $C_{13}H_{17}NO_2S$: C, 62.12; H, 6.82; N, 5.57. Found: C, 62.31; H, 6.79; N, 5.52.

EXAMPLE 5

2,2,5-Trimethyl-5-Styryl-4-Oxazolidinone

*Step A.*—A solution of methylmagnesium iodide in 150 ml. of ether is prepared in the standard manner from 35.5 g. (0.25 mole) of methyl iodide and 6.1 g. (0.25 mole) of magnesium. The solution is added dropwise during 45 minutes to a solution of 41.5 g. (0.22 mole) of methyl benzylidenepyruvate in 450 ml. of ether with cooling in an ice-salt bath. The mixture then is stirred 30 minutes in the cooling bath, and 30 minutes without cooling. The mixture is poured on ice and hydrochloric acid and the ether layer is separated, washed with sodium bicarbonate and water, and dried over sodium sulfate. Vacuum distillation yields 23.3 g. (56%) of methyl 2-hydroxy-2-methyl-4-phenyl-3-butenoate as a yellowish oil, B.P. 110–114° C. at 0.5 mm. pressure, $n_D^{23}=1.5455$.

*Analysis.*—Calculated for $C_{12}H_{14}O_3$: C, 69.88; H, 6.84. Found: C, 69.67; H, 6.99.

*Step B.*—Methyl 2-hydroxy-2-methyl-4-phenyl-3-butenoate (18.6 g., 0.09 mole, prepared as described above) is heated with a saturated solution of ammonia in 75 ml. of ethanol at 70° C. for 120 hours. The volatile materials are evaporated in vacuo and the residue triturated with petroleum ether to cause it to crystallize, yielding 14.5 g. of 2-hydroxy-2-methyl-4-phenyl-3-butenoamide, M.P. 116–118° C. A small sample recrystallized from a water-isopropyl alcohol mixture melts at 116.5–118.5° C.

*Analysis.*—Calculated for $C_{11}H_{13}NO_2$: N, 7.33. Found: N, 7.22.

*Step C.*—A solution of the 2-hydroxy-2-methyl-4-phenyl-3-butenoamide (2.7 g., 0.014 mole, prepared as described above) in 25 ml. of acetone containing 0.5 g. of dry hydrogen chloride is allowed to stand for 2 hours at room temperature and 16 hours at 5° C. The mixture is processed by substantially the same procedure described in Example 1, step B, and the product obtained is recrystallized from a 60% solution of methanol in water to yield 1.9 g., of 2,2,5-trimethyl-5-styryl-4-oxazolidinone, M.P. 142–143° C.

*Analysis.*—Calculated for $C_{14}H_{17}NO_2$: C, 72.70; H, 7.41; N, 6.06. Found: C, 72.59; H, 7.38; N, 6.01.

EXAMPLE 6

2,2-Dimethyl-5-(3-Phenylpropyl)-4-Oxazolidinone

*Step A.*—A solution of 3-phenylpropylmagnesium bromide in 100 ml. of ether is prepared from 49.7 g. (0.25 mole) of 3-phenylpropyl bromide and 6.0 g. (0.25 mole) of magnesium according to the usual procedures. To this solution, 29.6 g. (0.2 mole) of triethyl orthoformate is added. The resulting solution is refluxed 7 hours and the ether then evaporated completely and 250 ml. of 5 N hydrochloric acid added to the residue. The mixture is heated on the steam bath under nitrogen for ½ hour, then cooled, and the oily product taken up in ether. The ether solution is stirred with a saturated solution of sodium bisulfite and the bisulfite addition compound of 4-phenylbutyraldehyde, weighing 41.8 g., separates and is collected on a filter. The aldehyde-bisulfite addition compound (17.6 g., 0.07 mole) is added to 50 ml. of water. To the well stirred slurry is added dropwise a solution of 6 g. (0.09 mole) of potassium cyanide in 12 ml. of water during 20 minutes. The oily 2-hydroxy-5-phenylvaleronitrile that separates is extracted with ether. Evaporation of the ether yields 9.5 g. of 2-hydroxy-5-phenylvaleronitrile which is used in the following step without purification.

*Step B.*—To a cold solution of 2-hydroxy-5-phenylvaleronitrile (13 g., 0.074 mole, prepared as described above) in 65 ml. of ether is added a cold mixture of 25 ml. of concentrated hydrochloric acid and 25 ml. of concentrated sulfuric acid. The mixture is allowed to stand for 16 hours at 5° C. Dilution with water precipitates 2-hydroxy-5-phenylvaleramide, which upon recrystallization from ethanol-water gives 6.5 g. of product melting at 102.5–106.5° C. A small sample recrystallized for analysis melts at 105.5–108.0° C.

*Analysis.*—Calculated for $C_{11}H_{15}NO_2$: N, 7.25. Found: N, 7.22.

*Step C.*—A solution of 4.5 g. (0.023 mole) of 2-hydroxy-5-phenylvaleramide, 50 ml. of acetone, and 0.5 ml. of concentrated sulfuric acid is allowed to stand 60 hours at room temperature. The mixture then is processed by substantially the same procedure described in Example 1, step B, to yield 2,2-dimethyl-5-(3-phenylpropyl)-4-oxazolidinone which, after recrystallization from ethanol-water, yields 2.5 g. of product, M.P. 94.5–96.0° C.

*Analysis.*—Calculated for $C_{14}H_{19}NO_2$: C, 72.07; H, 8.21; N, 6.00. Found: C, 71.99; H, 8.07; N, 5.96.

EXAMPLE 7

2,2-Dimethyl-5-(2-Phenylpropenyl)-4-Oxazolidinone

*Step B.*—β-methylcinnamaldehyde is prepared by the method of Schmidle and Barnett, J.A.C.S. 78, 3209 (1956). This aldehyde (28.0 g., 0.19 mole) in 100 ml. of ether is stirred with 24.7 g. (0.38 mole) of potassium cyanide in a flask surrounded by an ice-bath. Concentrated hydrochloric acid is added dropwise during one-half hour until the mixture is neutral (pH 7) to Alkacid test paper. The mixture is stirred an additional 4 hours with ice-bath cooling. The ether solution containing the 2-hydroxy-4-phenyl-3-pentenonitrile is decanted and made up to 200 ml. volume by addition of more ether. An ice-cold mixture of 80 ml. each of concentrated hydrochloric and sulfuric acids is added and the resulting solution allowed to stand four hours at 5° C. Dilution with ice water precipitates 7.5 g. of 2-hydroxy-4-phenyl-3-pentenoamide, M.P. 130–133° C. Upon recrystallization from isopropyl alcohol the melting point of the amide is raised to 133–135° C.

*Analysis.*—Calculated for $C_{11}H_{13}NO_2$: N, 7.33. Found: N, 7.28.

*Step B.*—A solution of 5 g. (0.026 mole) of the thus obtained 2-hydroxy-4-phenyl-3-pentenoamide, 100 ml. of acetone and 1 ml. of concentrated sulfuric acid is allowed to stand 16 hours at room temperature. The mixture then is processed by substantially the same method described in Example 1, step B, and the product obtained is recrystallized from isopropyl alcohol to yield 3.7 g. of 2,2-dimethyl-5-(2-phenylpropenyl)-4-oxazolidinone, M.P. 132–133° C.

*Analysis.*—Calculated for $C_{14}H_{17}NO_2$: C, 72.70; H, 7.41; N, 6.06. Found: C, 72.49; H, 7.20; N, 6.10.

EXAMPLE 8

2,2-Dimethyl-5-p-Methylstyryl-4-Oxazolidinone

*Step A.*—Concentrated hydrochloric acid is added dropwise with ice-bath cooling during two hours to a stirred mixture of 48 g. (0.33 mole) of p-methylcinnamaldehyde, 350 ml. of ether, and 42.9 g. (0.66 mole) of potassium cyanide until the mixture is neutral to Alkacid test paper. The mixture is stirred four more hours surrounded by the ice-bath, and then placed for two days in a 5° C. refrigerator. The ether solution is decanted, made up to 500 ml. volume by the addition of more ether, and a cold mixture of 200 ml. each of concentrated hydrochloric acid and concentrated sulfuric acid is added. After standing 3.5 hours at 5° C., the solution is diluted with ice-water and the product that precipitates is recrystalled from isopropyl alcohol to yield 25 g. of 2-hydroxy-4-p-tolyl-3-butenoamide, M.P. 168–170° C. A small sample recrystallized for analysis melts at 169–170° C.

*Analysis.*—Calculated for $C_{11}H_{13}NO_2$: N, 7.33. Found: N, 7.29.

*Step B.*—A solution of 9.6 g. (0.05 mole) of the thus obtained 2-hydroxy-4-p-tolyl-3-butenoamide, 180 ml. of acetone and 1 ml. of concentrated sulfuric acid is allowed to stand 21 hours at room temperature. The mixture then is processed by substantially the same method described in Example 1, step B, and the product obtained is recrystallized from isopropyl alcohol to yield 8.8 g. of 2,2-dimethyl-5-p-methylstyryl-4-oxazolidinone, M.P. 144.5–145.5° C.

*Analysis.*—Calculated for $C_{14}H_{17}NO_2$: C, 72.70; H, 7.41; N, 6.06. Found: C, 72.39; H, 7.30; N, 6.03.

EXAMPLE 9

2,2-Dimethyl-5-m-Chlorostyryl-4-Oxazolidinone

*Step A.*—A mixture of 49.5 g. (0.35 mole) of m-chlorobenzaldehyde, 1.25 g. of sodium hydroxide, 75 ml. of water, and 30 ml. of ethanol is stirred under nitrogen while 6.3 g. (0.15 mole) of acetaldehyde in 12 ml. of water is added dropwise during 1 hour. A solution of 0.37 g. of sodium hydroxide in 5 ml. of water then is added and a solution of 6.3 g. of acetaldehyde in 12 ml. of water is added during 2 hours. The mixture is neutralized with acetic acid, and the oil is taken up in ether and dried over sodium sulfate. Evaporation of the ether and distillation of the residual oil yields 20 g. of m-chlorocinnamaldehyde, B.P. 135–156° C., at 15 mm. pressure.

*Step B.*—Concentrated hydrochloric acid is added dropwise with ice-bath cooling during 40 minutes to a stirred mixture of 11.4 g. (0.07 mole) of the thus obtained m-chlorocinnamaldehyde, 100 ml. of ether, and 9.1 g. (0.14 mole) of potassium cyanide until the mixture is neutral to Alkacid paper. After an additional hour of stirring in the ice-bath, the ether layer is decanted and stored 4 days at 5° C. An ice-cooled mixture of 40 ml. each of concentrated hydrochloric acid and concentrated sulfuric acid then is added, and the solution kept at 5° C. for 4 hours. Dilution with ice-water and recrystallization of the precipitated amide from ethyl acetate gives 7.0 g., of 2-hydroxy-4-m-chlorophenyl-3-butenoamide, M.P. 126.5–127.5° C.

*Analysis.*—Calculated for $C_{10}H_{10}ClNO_2$: N, 6.62. Found: N, 6.62.

*Step C.*—A solution of 5 g. (0.024 mole) of the thus obtained 2-hydroxy-4-m-chlorophenyl-3-butenoamide, 50 ml. of acetone, and 0.6 ml. of concentrated sulfuric acid is allowed to stand 16 hours at room temperature. The mixture then is processed by substantially the same method described in Example 1, step B, and the product obtained is recrystallized from isopropyl alcohol-water to yield 2.2 g. of 2,2-dimethyl-5-m-chlorostyryl-4-oxazolidinone, M.P. 107.5–109.5° C.

*Analysis.*—Calculated for $C_{13}H_{14}ClNO_2$: C, 62.03; H, 5.60; N, 5.57. Found: C, 62.22; H, 5.64; N, 5.57.

EXAMPLE 10

2,2-Dimethyl-5-o-Chlorostyryl-4-Oxazolidinone

By replacing the m-chlorocinnamaldehyde employed in Example 9, step B, by an equivalent quantity of o-chlorocinnamaldehyde, and following substantially the same procedure described in Example 9, steps B and C, there is first obtained the intermediate 2-hydroxy-4-o-chlorophenyl-3-butenoamide M.P. 117–118° C., and then the 2,2-dimethyl-5-o-chlorostyryl-4-oxazolidinone, M.P. 120–121° C.

*Analysis.*—Calculated for $C_{13}H_{14}ClNO_2$: C, 62.03; H, 5.60; N, 5.57. Found: C, 61.88; H, 5.50; N, 5.51.

EXAMPLE 11

2,2-Dimethyl-5-p-Chlorostyryl-4-Oxazolidinone

By replacing the m-chlorocinnamaldehyde employed in Example 9, step B, by an equivalent quantity of p-chlorocinnamaldehyde, and following substantially the same procedures described in Example 9, steps B and C, there is obtained 2,2-dimethyl-5-p-chlorostyryl-4-oxazolidinone which after recrystallization from ethanol, has a melting point of 164–165° C.

*Analysis.*—Calculated for $C_{13}H_{14}ClNO_2$: C, 62.03; H, 5.60; N, 5.57. Found: C, 61.83; H, 5.71; N, 5.52.

EXAMPLE 12

2,2-Dimethyl-5-p-Methoxyphenethyl-4-Oxazolidinone

*Step A.*—Potassium p-anisylidenepyruvate [130.5 g., 0.53 mole, prepared by the method of Stecher and Ryder, J.A.C.S. 74, 4392 (1952)], is dissolved in 3,500 ml. of water. Potassium borohydride (8.5 g., 0.159 mole) is added and the solution allowed to stand at room temperature for 64 hours. Acidification precipitates 78 g. of the crude 2-hydroxy-4-p-methoxyphenyl-3-butenoic acid, M.P. 133–136° C. Hydrogenation of the hydroxy acid over a platinum catalyst in dilute sodium hydroxide solution at room temperature and an initial pressure of about 3 atmospheres gives the 2-hydroxy-4-p-methoxyphenylbutyric acid in 90% yield, M.P. 115–118° C. (Cordier, Bull. Soc. Chem. France (1956), page 564, gives M.P. 116° C. for this compound.)

*Step B.*—A solution of 70 g. (0.33 mole) of 2-hydroxy-4-p-methoxyphenylbutyric acid in 825 ml. of methanol with 8 ml. of concentrated sulfuric acid is refluxed 6 hours. Most of the methanol then is evaporated in vacuo and the residue is poured into a sodium bicarbonate solution. The resulting methyl ester is separated and shaken with 250 ml. of concentrated ammonium hydroxide. The amide quickly forms and solidifies. Upon recrystallization from ethanol there is obtained 46.5 g. of pure 2-hydroxy-4-p-methoxyphenylbutyramide, M.P. 158.5–160.5° C.

*Analysis.*—Calculated for $C_{11}H_{15}NO_3$: N, 6.69. Found: N, 6.68.

*Step C.*—A solution of 10 g. (0.048 mole) of the thus obtained 2-hydroxy-4-p-methoxyphenylbutyramide, 150 ml. of acetone, and 1 ml. of concentrated sulfuric acid is allowed to stand 16 hours at room temperature. The mixture then is processed by substantially the same procedure described in Example 1, step B, and the product obtained is recrystallized from benzene-petroleum ether to yield 6.0 g., of 2,2 - dimethyl - 5 - p - methoxyphenethyl - 4 - oxazolidinone, M.P. 79.5–81.5° C.

*Analysis.*—Calculated for $C_{14}H_{19}NO_3$: C, 67.44; H, 7.68; N, 5.62. Found: C, 67.51; H. 7.56; N, 5.58.

EXAMPLE 13

2,2,3-Trimethyl-5-Styryl-4-Oxazolidinone

Sodium hydride (1.3 g., 0.055 mole) is added to 50 ml. of dry benzene and the mixture stirred while a solution of 10.8 g. (0.05 mole) of 2,2-dimethyl-5-styryl-4-oxazolidinone (prepared as described in Example 1) in 100 ml. of dry benzene is added during 15 minutes, whereupon hydrogen is vigorously given off and a practically clear solution results. Methyl iodide (9.2 g., 0.065 mole) is added all at once, and the solution is refluxed. After 1 hour, an additional 1 g. of methyl iodide is added. After two hours, the mixture containing precipitated sodium iodide is cooled, washed with two portions of water and dried over sodium sulfate. When the benzene is distilled off in vacuo, the residue crystallizes. Two recrystallizations of this material from isopropyl alcohol gives 6.0 g. of 2,2,3-trimethyl-5-styryl-4-oxazolidinone, M.P. 86–88° C. A small sample recrystallized for analysis melts at 87–88° C.

*Analysis.* — Calculated for $C_{14}H_{17}NO_2$: C, 72.70; H, 7.41; N, 6.06. Found: C, 72.41; H, 7.37; N, 6.02.

EXAMPLE 14

2-Chloromethyl-2-Methyl-5-styryl-4-oxazolidinone

A solution of 5.0 g. (0.028 mole) of 2-hydroxy-4-phenyl-3-butenoamide and 0.5 cc. of concentrated sulfuric acid in 50 cc. of chloroacetone is stirred 18 hours at room temperature. The mixture then is neutralized by the addition of sodium bicarbonate solution and most of the excess chloroacetone is removed by distillation in vacuo to give 2-chloromethyl-2-methyl-5-styryl-4-oxazolidinone, M.P. 113–114° C., yield 1.3 g.

*Analysis.* — Calculated for $C_{13}H_{14}ClNO_2$: Cl, 14.1. Found: Cl, 13.7.

EXAMPLE 15

5-Benzyl-2,2-Dimethyl-4-Oxazolidinone

A solution of 10 g. (0.06 mole) of 2-hydroxy-3-phenyl-propionamide and 1 cc. of concentrated sulfuric acid in 100 cc. of acetone is allowed to stand 18 hours at room temperature. The mixture then is neutralized by the addition of sodium bicarbonate solution. Most of the acetone is removed by distillation in vacuo and the residual solution is diluted with 50 cc. of water whereupon an oil separates which quickly crystallizes. Recrystallization of the product thus obtained from aqueous ethanol gives 10.0 g. of 5-benzyl-2,2-dimethyl-4-oxazolidinone, M.P. 111–112° C.

*Analysis.*—Calculated for $C_{12}H_{15}NO_2$: C, 70.2; H, 7.31; N, 6.83. Found: C, 69.86; H, 7.33; N, 6.80.

EXAMPLE 16

2,2-Dimethyl-5-(1,2-Dibromo-2-Phenylethyl)-4-Oxazolidinone 2,2-dimethyl-5-styryl-4-oxazolidinone (5.0 g., 0.023 mole, prepared as described in Example 1) is stirred in 25 cc. of chloroform while 3.7 g. (0.023 mole) of bromine in 10 cc. of chloroform is added dropwise. After the addition is completed, the solvent is removed by distillation in vacuo and the residue crystallized. Recrystallization from aqueous ethanol gives 4.5 g. of 2,2-dimethyl-5-(1,2-dibromo-2-phenylethyl)-oxazolidinone M.P. 182–183° C. (dec.).

*Analysis.* — Calculated for $C_{13}H_{15}Br_2NO_2$: Br, 42.5. Found: Br, 41.5.

EXAMPLE 17

2,2-Dimethyl-5-Phenylmercaptomethyl-4-Oxazolidinone

*Step A.*—A mixture of 60 g. (0.266 mole) of phenylmercaptoacetaldehyde diethylacetal, 300 cc. of water, 3 cc. of concentrated sulfuric acid and 75 cc. of acetic acid is refluxed for 1½ hours under an atmosphere of nitrogen. The solution then is cooled and extracted with ether. The ether extract is dried and evaporated leaving phenylmercaptoacetaldehyde as an oil.

*Step B.*—Phenylmercaptoacetaldehyde (40.0 g., 0.264 mole) is shaken with a solution of 100 g. of sodium bisulfite in 200 cc. of water. The bisulfite addition compound which separates (weight, 53 g.) is stirred in an ice bath with a mixture of 200 cc. of water and 200 cc. of ether while a solution of 25 g. of sodium cyanide in 100 cc. of water is added over a period of 1 hour. After an additional hour of stirring, the ether layer is separated, dried and evaporated, leaving 28 g. of 2-hydroxy-3-phenylmercaptopropionitrile as an oil. This substance then is dissolved in 140 cc. of ether and cooled to 0°. An ice-cold mixture of 55 cc. of concentrated hydrochloric acid and 55 cc. of concentrated sulfuric acid is added and the solution allowed to stand at 5° C., for 19 hours. Dilution with water precipitates 2-hydroxy - 3 - phenylmercaptopropionamide which is recrystallized from ethanol yielding 22.0 g. of product, M.P. 113–114° C.

*Analysis.*—Calculated for $C_9H_{11}NO_2S$: C, 54.7; H, 5.58; N, 7.11; S, 16.23. Found: C, 54.50; H, 5.60; N, 7.20; S, 16.28.

*Step C.*—A solution of 10 g. (0.051 mole) of the thus obtained amide, 1 cc. of concentrated sulfuric acid and 100 cc. of acetone is stirred about 18 hours at room temperature. The mixture then is neutralized by the addition of sodium bicarbonate solution and most of the excess acetone is removed by distillization in vacuo. The product precipitates and is recrystallized in ethanol to give 9.5 g. of 2,2-dimethyl-5-phenylmercaptomethyl-4-oxazolidinone, M.P. 102–103° C.

*Analysis.*—Calculated for $C_{12}H_{15}NO_2S$: C, 60.65; H, 6.32; N, 5.91; S, 13.5. Found: C, 60.52; H, 6.40; N, 5.95; S, 13.56.

EXAMPLE 18

2,2-Dimethyl-5-Phenoxymethyl-4-Oxazolidinone

*Step A.*—Phenoxyacetaldehyde (48 g., 0.35 mole) is added dropwise to a stirred solution of 96 g. of sodium bisulfite in 192 cc., of water. The precipitated bisulfite addition compound (weight, 65.5 g.) is stirred in an ice-bath with 100 cc. of water and 100 cc. of ether while a solution of 17.3 g. of sodium cyanide in 35 cc. of water is added. After 1½ hours, the ether layer is separated, dried and evaporated leaving 45.5 g. of 3-phenoxylactonitrile as an oil.

*Step B.*—A solution of 45.5 g. (0.28 mole) of 3-phenoxylactonitrile in 280 cc., of ether is chilled and an ice-cold mixture of 100 cc. each of concentrated hydrochloric and sulfuric acids is added. After 16 hours at 5° C., 400 cc. of ice water is added. The precipitated product is recrystallized from ethanol to give 21 g. of 3-phenoxylactamide, M.P. 149–150° C.

*Analysis.*—Calculated for $C_9H_{11}NO_3$: C, 59.7; H, 6.08; N, 7.74. Found: C, 59.3; H, 6.08; N, 7.87.

*Step C.*—A mixture of 10 g. (0.055 mole) of 3-phenoxylactamide, 1 cc. of concentrated sulfuric acid and 150 cc. of acetone is stirred about 18 hours at room temperature. The mixture then is neutralized by the addition of sodium bicarbonate solution and most of the excess acetone is removed by distillation in vacuo. The product precipitates and is recrystallized from ethanol to give 8.6 g. of 2,2-dimethyl-5-phenoxymethyl-4 - oxazolidinone, M.P. 109–110° C.

*Analysis.*—Calculated for $C_{12}H_{15}NO_3$: C, 65.1; H, 6.79; N, 6.33. Found: C, 65.0; H, 6.74; N, 6.40.

EXAMPLE 19

*2,2-Dimethyl-5-[3-(p-Methoxyphenyl)Propyl]-4-Oxazolidinone*

*Step A.*—A solution of p - methoxyphenylpropylmagnesium bromide in 100 cc. of ether is prepared from 52.6 g. (0.23 mole) of 3-p-methoxyphenylpropyl bromide and 5.6 g. (0.23 mole) of magnesium. To this solution there is added 27.6 g. (0.187 mole) of triethyl orthoformate and the mixture is refluxed for 7 hours. The ether then is evaporated and 230 cc. of 5 N hydrochloric acid is added. The mixture is heated on a steam bath for 30 minutes under nitrogen, and the oily layer which forms is taken up in ether and shaken with 200 cc. of saturated sodium disulfite solution. The bisulfite addition compound which precipitates weighs 28 g. This addition compound then is slurried in 50 cc. of water and a solution of 6 g. of potassium cyanide and 12 cc. of water is added dropwise. After one hour, the oily layer is taken up in ether, dried and the solvent evaporated to give 15 g. of 2-hydroxy-5-p-methoxyphenylvaleronitrile in the form of an oil.

*Step B.*—The nitrile thus obtained (15 g. 0.073 mole) is hydrolized by substantially the same method described in Example 18, step B, to give 9.8 g. of 2-hydroxy-5-p-methoxyphenylvaleramide, M.P. 138–139° C.

*Analysis.*—Calculated for $C_{12}H_{17}NO_3$: C, 64.6; H, 7.63; N, 6.27. Found: C, 64.6; H, 7.72; N, 6.24.

*Step C.*—A mixture of 9.0 g. (0.04 mole) of the thus obtained amide, 1 cc. of concentrated sulfuric acid and 100 cc. of acetone is stirred about 18 hours at room temperature. The mixture then is neutralized by the addition of sodium bicarbonate solution and most of the excess acetone is removed by distillation in vacuo. The product precipitates and is recrystallized from ethanol to give 7.5 g. of 2,2-dimethyl-5-[3-(p-methoxyphenyl)-propyl]-4-oxazolidinone, M.P. 74–75° C.

*Analysis.*—Calculated for $C_{15}H_{21}NO_3$: C, 68.4; H, 7.99; N, 5.32. Found: C, 68.4; H, 7.99; N, 5.31.

The novel compounds of this invention possess central nervous systems stimulating properties and therefore are useful in therapy as anti-depresant agents to produce clinical effects similar to those obtainable by amphetamine but with less behavioral toxicity in that they do not produce restlessness or inhibit appetite as is generally produced by amphetamine and its derivatives. The novel compounds of this invention also differ from amphetamine in that they do not exhibit a propensity to show tolerance upon continued administration such as generally is shown by amphetamine type compounds. The novel compounds also possess anti-convulsant properties and therefore are useful in the treatment or prevention of epileptic seizures particularly of the petit mal type.

As the dosage of the compound to be administered will vary over a wide range, depending upon whether it is intended for children, adults or aged people and depending upon other factors, dosage forms containing from about 50–500 mg. or more of the active ingredient per unit dosage can be made available to the physician for the symptomatic adjustment of the dosage on a 1–4 times a day regimen. The quantity of product to be administered to produce the desired response presents no serious problem as the compounds of this invention have a high therapeutic index. For example, the compound of Example 1, 2,2-dimethyl-5-styryl-4-oxazolidinone gave the following data in acute toxicity studies when suspended in 1% aqueous carboxymethylcellulose solution.

In mice:
  Oral—                                      Mg./kg.
    $LD_0$ -------------------------------- 1,000
    $LD_{50}$ ----------------------------- 1,630
    $LD_{100}$ ---------------------------- 2,250
      (Confidence range 1440–1840)
  I.p.[1]—
    $LD_0$ --------------------------------   600
    $LD_{50}$ -----------------------------   818
    $LD_{100}$ ---------------------------- 1,040
      (Confidence range 765–874)

In the female rat:
  Oral—
    $LD_0$ -------------------------------- 2,000
    $LD_{50}$ ----------------------------- 4,710
    $LD_{100}$ ---------------------------- 6,750
      (Confidence range 4020–5520)
  I.p.[1]—
    $LD_0$ --------------------------------   296
    $LD_{50}$ -----------------------------   427
    $LD_{100}$ ----------------------------   650
      (Confidence range 380–481)

In the male rat:
  Oral—
    $LD_0$ -------------------------------- 2,000
    $LD_{50}$ ----------------------------- 4,320
    $LD_{100}$ ---------------------------- 6,750
      (Confidence range 3640–5250)
  I.p.[1]—
    $LD_0$ --------------------------------   228
    $LD_{50}$ -----------------------------   432
    $LD_{100}$ ----------------------------   650
      (Confidence range 377–498)

[1] I.p. means intraperitoneal.

Acute toxicity studies in mice with 2,2-dimethyl-5-(3-phenylpropyl)-4-oxazolidinone, the compound of Example 6, suspended in 1% aqueous carboxymethylcellulose, gives, intraperitoneally, an $LD_0$ of 720 mg./kg.
$LD_{50}$ of 913 mg./kg.
$LD_{90}$ of 1,040 mg./kg.

(Confidence range 854–975)

and acute toxicity studies in mice with 2,2-dimethyl-5-phenethyl-4-oxazolidinone (Examples 3 and 3a compound) gave (i.p.)

$LD_0$ of over 500 mg./kg.
$LD_{50}$ of over 600 mg./kg.
$LD_{100}$ of over 865 mg./kg.

(Confidence range 540–667)

As the novel compounds of this invention will generally be administered orally in solid dosage forms and as these dosage forms can be prepared by methods well known to pharmacists, only one example is included herein to illustrate the preparation of a representative dosage form.

EXAMPLE 20

*Dry-Filled Capsules Containing 250 Mgs. of Active Ingredient Per Capsule*

|  | Per capsule, mg. |
|---|---|
| 2,2-dimethyl-5-styryl-4-oxazolidinone | 250 |
| Lactose | 100 |
|  | 350 |

The 2,2-dimethyl-5-styryl-4-oxazolidinone is reduced to a No. 60 powder, lactose then is passed through a No. 60 bolting cloth onto the powder, the combined ingredients are mixed for 10 minutes and then filled into No. 1 hard gelatin capsules.

While the above examples describe the preparation of certain 2,2,5-trisubstituted - 4 - oxazolidinone compounds illustrated by the general structural formula reproduced in the introductory portion of the disclosure and a certain specific dosage form suitable for administering the compounds in therapy, and certain reaction conditions for preparing the compounds, it is to be understood that the invention is not to be limited by these examples or by the specific reaction conditions described for the preparation of the compounds or by the specific ingredients included in the pharmaceutical preparation, but is to be understood to embrace variations and modifications thereof which fall within the scope of the appended claims.

This application is a continuation in part of my co-pending U.S. application Serial No. 5,112, filed January 28, 1960, now abandoned.

What is claimed is:

1. 4-oxazolidinone having the formula:

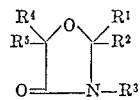

wherein $R^1$ and $R^2$ respectively is lower alkyl; $R^3$ and $R^5$ each is selected from the group consisting of hydrogen and lower alkyl; and $R^4$ is selected from the group consisting of phenyl-lower-alkyl, phenyl-lower-alkenyl, (halo-phenyl)-lower-alkyl, phenyl - lower - (alkoxyalkyl), phenyl - lower - alkyl, phenyl - mercapto - lower - alkyl and phenyl-lower-(alkylmercaptoalkyl).

2. 2,2 - di - (lower-alkyl)-5-(phenyl-lower-alkenyl)-4-oxazolidinone.

3. 2,2-di-(lower-alkyl)-5-styryl-4-oxazolidinone.

4. 2,2-dimethyl-5-styryl-4-oxazolidinone.

5. 2,2 - di - (lower-alkyl) - 5 - (phenyl-lower-alkyl)-4-oxazolidinone.

6. 2,2-dimethyl-5-(3-phenylpropyl)-4-oxazolidinone.

7. 2,2-dimethyl-5-phenethyl-4-oxazolidinone.

8. 2,2,5-tri-lower-alkyl - 5 - (phenyl-lower-alkenyl)-4-oxazolidinone.

9. 2,2,3 - tri - lower-alkyl-5-(phenyl-lower-alkenyl)-4-oxazolidinone.

10. 2,2 - di - lower-alkyl - 5 - p - (lower-alkoxyphenyl-lower-alkyl)-4-oxazolidinone.

11. 2,2 - di - (lower-alkyl) - 5 - (chlorophenyl-lower-alkenyl)-4-oxazolidinone.

12. 2,2-di-(lower-alkyl) - 5 - (lower-alkylphenyl-lower alkenyl)-4-oxazolidinone.

13. 2,2-dimethyl - 5 - benzylmercaptomethyl-4-oxazolidinone.

References Cited in the file of this patent

D'Ianni et al.: J. Am. Chem. Soc., volume 61, page 1677 (1939).